UNITED STATES PATENT OFFICE 2,499,352

SUBSTITUTED GLYCINAMIDES

William F. Bruce, Havertown, and Joseph Seifter, Willow Grove, Pa., assignors to Wyeth Incorporated, Philadelphia, Pa., a corporation of Delaware No Drawing. Application January 2, 1948, Serial No. 358

2 Claims. (Cl. 260—558)

This invention relates to new substituted glycinamides having important physiological properties and having the general formula $$R_1NHCH_2CONHR_2$$

wherein $R_1$ and $R_2$ represent aralkyl radicals having 3 carbon atoms in the alkyl chain.

The aralkyls, represented by $R_1$ and $R_2$ in the above formula may have one or more hydrogens in the ring or in the alkyl chain substituted by a hydroxy or alkoxy group and the alkyl chain itself may be of the straight or the branched-chain type.

New compounds of this invention evidence useful and unexpected pharmacological action in that they possess at least one of the following physiological actions: local anesthetic, vasoconstrictor, spasmolytic, analgesic, sedative and convulsant action.

It is known that certain amines possess a vasoconstrictor action and are identified as pressor amines. As an important feature of the invention, it has been discovered that when pressor amines, represented by the above-mentioned $R_1NH_2$ or $R_2$—$NH_2$ amines, are used as intermediates in forming the new compounds, and particularly when $R_1NH_2$ is a pressor amine, the new products possess pronounced physiological action. When both amines are pressor amines, even greater physiological action in the new compounds has been noted. Thus in substituted glycinamides corresponding to the formula $$R_1NHCH_2CONHR_2$$

when a pressor amine has been combined, and particularly on the amino side (left-hand side) of the molecule, the compounds possess very considerable anesthetic action and in some cases anesthetic action of a high order combined with pressor action. While certain pressor amines may themselves possess a certain small amount of local anesthetic action, a surprising increase in anesthetic action has been found in the corresponding glycinamide compounds.

It has been discovered in the compounds of the invention having the general formula $$R_1NHCH_2CONHR_2$$

that when the radicals $R_1NH$ and/or $NHR_2$ are the residues of primary pressor amines, a critically new physiological action is found that is different from the physiological action of the primary pressor amines alone.

In general, the compounds of the invention may be synthesized by reacting an appropriate chloroacetamide corresponding to the formula $$ClCH_2CONHR_2$$

with an appropriate primary amine corresponding to the formula $$R_1NH_2$$

where $R_1$ and $R_2$ have the same meaning as indicated hereinabove.

The primary amine may be prepared in known manner. The preferred method for preparation of the chloroacetamide intermediate involves reacting chloroacetylchloride with a primary amine $R_2$—$NH_2$ in the presence of benzene as a solvent for the reactants. Heating may or may not be necessary depending on the speed of the particular reaction. The chloroacetamide remains in solution and is separated from the solvent by distilling off the latter under low pressures. In general, a molar ratio of chloride to amine of about 1:2 is preferred for the reaction.

The reaction of the appropriate chloroacetamide and the appropriate primary amine to form the desired substituted glycinamide is preferably operated with a molar ratio, amide to amine of about 1:1 and is carried out in the presence of a solvent for the reactants such as higher alcohols having four to seven carbon atoms in the molecule, dioxane or hydrocarbon solvents, for example, xylene. The reaction is carried out also in the presence of an acid acceptor or mildly basic material such as alkali or alkaline earth metal carbonates, sodium bicarbonate or alkali metal alcoholates, and preferably about 2 to 3 mols of this material is used. The reaction operation is set up for refluxing and the temperature is the refluxing temperature of the particular solvent selected. Generally, a period of about 10–15 hours is sufficient for complete reaction. In the event that solids are formed, these are removed by filtration, the product remaining in solution in the solvent. The solvent is then removed by distillation at low pressures to obtain the substituted glycinamide product.

Preceeding to a better understanding of this invention, the following example illustrates a specific procedure for the preparation of a representative compound falling within the general formula.

EXAMPLE

*Preparation of alpha-(1-methyl-2-phenylethylamino)-N-(1-methyl-2-phenylethyl) acetamide*

For the preparation of the appropriate chloracetamide intermediate, a solution of 27 grams of amphetamine in 80 c. c. of benzene was added in portions to a solution of 11.3 grams of chloracetyl chloride in benzene. Heat was evolved and the addition was done at a rate which kept the temperature between 50° and 60° C. On standing, solid amphetamine hydrochloride precipitated and was collected on a filter. This weighed 13.5 grams and melted at 149° C. The filtrate after removal of the solvent in vacuo gave a yellow oil which solidified on standing. It weighed 26 grams and melted at 68° C. It was moderately soluble in cold ethanol and ethyl acetate and readily soluble in chloroform. It was crystallized from ethyl acetate with the addition of petroleum ether. The recrystallized product, N-alpha-chloraceto-amphetamine melted at 71–72° C. Analysis showed 6.0% N (calcd. 6.6%). A sample on distillation boiled at 155–165° C. at 3 mm.

A solution of 10 grams of N-alpha-chloraceto amphetamine and 7 grams of amphetamine in 25 c.c. of n-butanol together with 4.2 grams of sodium carbonate was refluxed for 12 hours. The organic layer was washed with water, dried, concentrated in vacuo and distilled. The product, alpha - (1 - methyl - 2 - phenylethylamino) - N-(1-methyl-2-phenylethyl) acetamide boiled at 234–238° C. at a pressure of 3 mm. The yield was 10 grams and was a colorless, viscous oil.

*Analysis*

|  | Nitrogen |
|---|---|
| Calculated for $C_{20}H_{26}N_2O$ | 9.03 |
| Found | 8.78 |

By procedures analogous to that described in the above example, the appropriate primary amine $R_1NH_2$ and preferably a pressor amine can be reacted with the appropriate chloracetamide $ClCH_2CONHR_2$, where $R_1$ and $R_2$ represent the radicals indicated above, to form the following substituted glycinamides representative of those comprehended in this invention Alpha - (2-p,m - dihydroxyphenyl - 1 - methylethylamino)-N-(2-hydroxy -2- phenylpropyl) acetamide.

Alpha-(1- methyl - 2 - phenylethylamino) -N-3-phenylpropyl acetamide.

Alpha-(phenylisopropylamino) -N- (1-methyl-2-phenylethyl) acetamide.

Substantially all of the products of the invention are high boiling basic liquids of limited solubility. It is contemplated within the scope of this invention that while the products may be used in their basic form, they may also be prepared and used in the well-known manner in the form of their acid-addition salts. The preparation of such a salt is well-known and generally involves the addition of the selected acid to an ether, alcohol or water solution of the basic product. The acid is chosen to yield a salt which is known to those skilled in the art as being physiologically non-toxic. As examples, the hydrochloride, sulfate or acetate salts of the new products may be used.

It is further contemplated that those substituted glycinamides, or the non-toxic salts thereof, which are less soluble in dilute acid than 0.5% by weight, may be brought into satisfactory solution by the use of solubilizing, surface-active, emulsifying or detergent agents in order to obtain a more complete physiological effect of the specific substituted glycinamide. Lipoid solvents having a physiologically non-toxic effect such as long chain fatty acid partial esters of hexitol anhydrides or oxy-alkylene derivatives thereof, vegetable and animal oils and ointment bases such as petroleum jelly or cholesterol are examples of solvents that are considered useful in admixture with the substituted glycinamides for obtaining an enhanced physiological effect.

This application is a continuation-in-part of application Serial No. 668,786, filed May 10, 1946, now Patent No. 2,449,638, dated September 21, 1948.

We claim:

1. New compounds selected from the group consisting of substituted glycinamides, corresponding to the formula $R_1NHCH_2CONHR_2$ wherein $R_1$ and $R_2$ are both monophenalkyl radicals having 3 carbon atoms in the alkyl chain; and the non-toxic salts of said glycerinamides.

2. The new compound, alpha -(1- methyl-2-phenylethylamino)-N-(1-methyl-2-phenylethyl) acetamide.

WILLIAM F. BRUCE.
JOSEPH SEIFTER.

REFERENCES CITED

The following references are of record in the file of this patent:

UNITED STATES PATENTS

| Number | Name | Date |
|---|---|---|
| 2,411,662 | Martin et al. | Nov. 26, 1946 |
| 2,449,638 | Bruce | Sept. 21, 1948 |

OTHER REFERENCES

Braun, "Ber. Deut. Chem." vol. 60 (1927), page 352.

Certificate of Correction

Patent No. 2,499,352                                                March 7, 1950

WILLIAM F. BRUCE ET AL.

It is hereby certified that errors appear in the printed specification of the above numbered patent requiring correction as follows:

Column 2, line 45, for "Preceeding" read *Proceeding*; column 4, line 38, for "glycerinamides" read *glycinamides*;

and that the said Letters Patent should be read with these corrections therein that the same may conform to the record of the case in the Patent Office.

Signed and sealed this 22nd day of August, A. D. 1950.

[SEAL]

THOMAS F. MURPHY,
*Assistant Commissioner of Patents.*